US012582042B2

(12) United States Patent
Furuta et al.

(10) Patent No.: US 12,582,042 B2
(45) Date of Patent: Mar. 24, 2026

(54) AUTONOMOUS TRAVELING WORK APPARATUS

(71) Applicant: HONDA MOTOR CO., LTD., Tokyo (JP)

(72) Inventors: Sotaro Furuta, Wako (JP); Fumio Minami, Wako (JP); Kohei Matsuzawa, Wako (JP); Kei Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 497 days.

(21) Appl. No.: 18/184,884

(22) Filed: Mar. 16, 2023

(65) Prior Publication Data

US 2024/0306542 A1 Sep. 19, 2024

(51) Int. Cl.
| | |
|---|---|
| *A01D 43/16* | (2006.01) |
| *A01D 34/00* | (2006.01) |
| *A01D 34/84* | (2006.01) |

(52) U.S. Cl.
CPC ........... *A01D 43/16* (2013.01); *A01D 34/008* (2013.01); *A01D 34/84* (2013.01)

(58) Field of Classification Search
CPC ...... A01D 34/84; A01D 34/008; A01D 34/42; A01D 34/52; A01D 34/863; A01D 43/16; A01D 2101/00
USPC ................. 172/123, 12, 548, 16, 45, 13, 14; 56/17.1, 264; 30/DIG. 5
See application file for complete search history.

(56) References Cited

U.S. PATENT DOCUMENTS

| | | | | | |
|---|---|---|---|---|---|
| 1,523,729 | A | * | 1/1925 | Snyder ..................... | A01G 3/06 |
| | | | | | 172/16 |
| 1,950,472 | A | * | 3/1934 | Bowers .................. | A01D 34/84 |
| | | | | | 30/240 |
| 2,212,057 | A | * | 8/1940 | Waller ..................... | A01G 3/06 |
| | | | | | 30/240 |
| 2,268,226 | A | * | 12/1941 | Ronning ............... | A01D 34/62 |
| | | | | | 56/294 |
| 2,521,033 | A | * | 9/1950 | Bell ........................ | A01G 3/062 |
| | | | | | 56/17.4 |
| 2,612,741 | A | * | 10/1952 | Mckay ................... | A01G 3/062 |
| | | | | | 56/16.9 |

(Continued)

FOREIGN PATENT DOCUMENTS

| | | | | | |
|---|---|---|---|---|---|
| GB | 190916613 | A | * | 7/1910 | ............. A01D 34/84 |
| JP | 2021-153507 | A | | 10/2021 | |

*Primary Examiner* — Joseph M Rocca
*Assistant Examiner* — Sunny D Webb
(74) *Attorney, Agent, or Firm* — Rankin, Hill & Clark LLP

(57) ABSTRACT

An autonomous traveling work apparatus includes a work unit including a passive rotary cutter that passively rotates, a driving rotary cutter that is driven to rotate, and a fixed cutter that does not rotate. The passive rotary cutter has a rotation axis passing through a rotation center thereof and oriented in a direction intersecting the front-rear direction of a vehicle body, and includes a plurality of blade parts on the outer peripheral portion of the passive rotary cutter. The fixed cutter is adjacent to the passive rotary cutter. The driving rotary cutter has a rotation axis passing through a rotation center thereof and oriented in the direction intersecting the front-rear direction of the vehicle body, and rotates by means of a drive device. The driving rotary cutter cuts the vegetation above the lower end of the passive rotary cutter.

10 Claims, 4 Drawing Sheets

(56) References Cited

U.S. PATENT DOCUMENTS

| 2,718,742 | A | * | 9/1955 | Tangeman | A01G 3/062 172/15 |
| 2,913,058 | A | * | 11/1959 | Smith | A01G 3/062 172/14 |
| 3,217,812 | A | * | 11/1965 | Gallion | A01G 3/062 172/16 |
| 3,559,742 | A | * | 2/1971 | Rogillio, Sr. | A01G 3/062 172/15 |
| 3,590,926 | A | * | 7/1971 | Tepera | A01G 3/062 172/15 |
| 3,656,555 | A | * | 4/1972 | Johns, Sr. | A01G 3/062 172/16 |
| 3,872,930 | A | * | 3/1975 | Campbell | A01D 34/84 172/15 |
| 4,002,205 | A | * | 1/1977 | Falk | A01B 33/028 37/351 |
| 4,278,133 | A | * | 7/1981 | de Marcellus | A01G 3/062 37/243 |
| 5,301,757 | A | * | 4/1994 | Kelley, Jr. | A01D 34/84 172/15 |
| 2002/0153145 | A1 | * | 10/2002 | Holzinger | A01G 3/062 172/15 |
| 2021/0302970 | A1 | * | 9/2021 | Takahashi | G05D 1/0212 |

* cited by examiner

RIGHT

LEFT

UP

DOWN

REAR

FRONT

AUTONOMOUS TRAVELING WORK APPARATUS

BACKGROUND OF THE INVENTION

Field of the Invention

The present invention relates to an autonomous traveling work apparatus capable of performing work while autonomously traveling.

Description of the Related Art

JP 2021-153507 A discloses an autonomous traveling work apparatus for mowing grass such as lawn while autonomously traveling. The autonomous traveling work apparatus recognizes a boundary between lawn to be mowed and a structure and cuts an edge of the lawn along the boundary.

The autonomous traveling work apparatus includes a cutter blade provided so as to protrude from a side portion of the vehicle body. When the autonomous traveling work apparatus is switched to an operating state for cutting the edge of the lawn, the cutter blade is lowered toward the ground. In the operating state, a portion of the cutter blade sequentially contacts the ground. In this state, another portion of the cutter blade cuts the edge of the lawn.

SUMMARY OF THE INVENTION

When the cutting edge of the cutter blade becomes worn, it is necessary to grind or replace the cutter blade. That is, maintenance is required. When the cutting edge of the cutter blade is easily worn, the frequency of maintenance increases.

An object of the present invention is to solve the above-mentioned problem.

According to an aspect of the present invention, there is provided an autonomous traveling work apparatus comprising: a traveling wheel provided on a vehicle body; a control unit configured to control the traveling wheel; and a work unit configured to mow vegetation, wherein the work unit includes: a passive rotary cutter that is rotatably supported on one of a left side or a right side of the vehicle body, has a rotation axis passing through a rotation center of the passive rotary cutter and oriented in a direction intersecting a front-rear direction of the vehicle body, and includes a plurality of blade parts on an outer peripheral portion of the passive rotary cutter; a fixed cutter that is disposed on the one of the left side or the right side of the vehicle body, is disposed adjacent to the passive rotary cutter, and is configured not to rotate; and a driving rotary cutter that is supported on the one of the left side or the right side of the vehicle body, has a rotation axis passing through a rotation center of the driving rotary cutter and oriented in the direction intersecting the front-rear direction, and is configured to rotate by means of a drive device, and wherein the passive rotary cutter passively rotates in response to the passive rotary cutter receiving a ground reaction force as the autonomous traveling work apparatus travels, and the driving rotary cutter cuts the vegetation above a lower end of the passive rotary cutter.

According to the above configuration, the driving rotary cutter is prevented from coming into contact with the ground when edging for cutting vegetation in the vertical direction is performed. Therefore, wear of the driving rotary cutter is suppressed. As a result, the replacement frequency of the driving rotary cutter is reduced, so that the running cost of the autonomous traveling work apparatus can be reduced.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
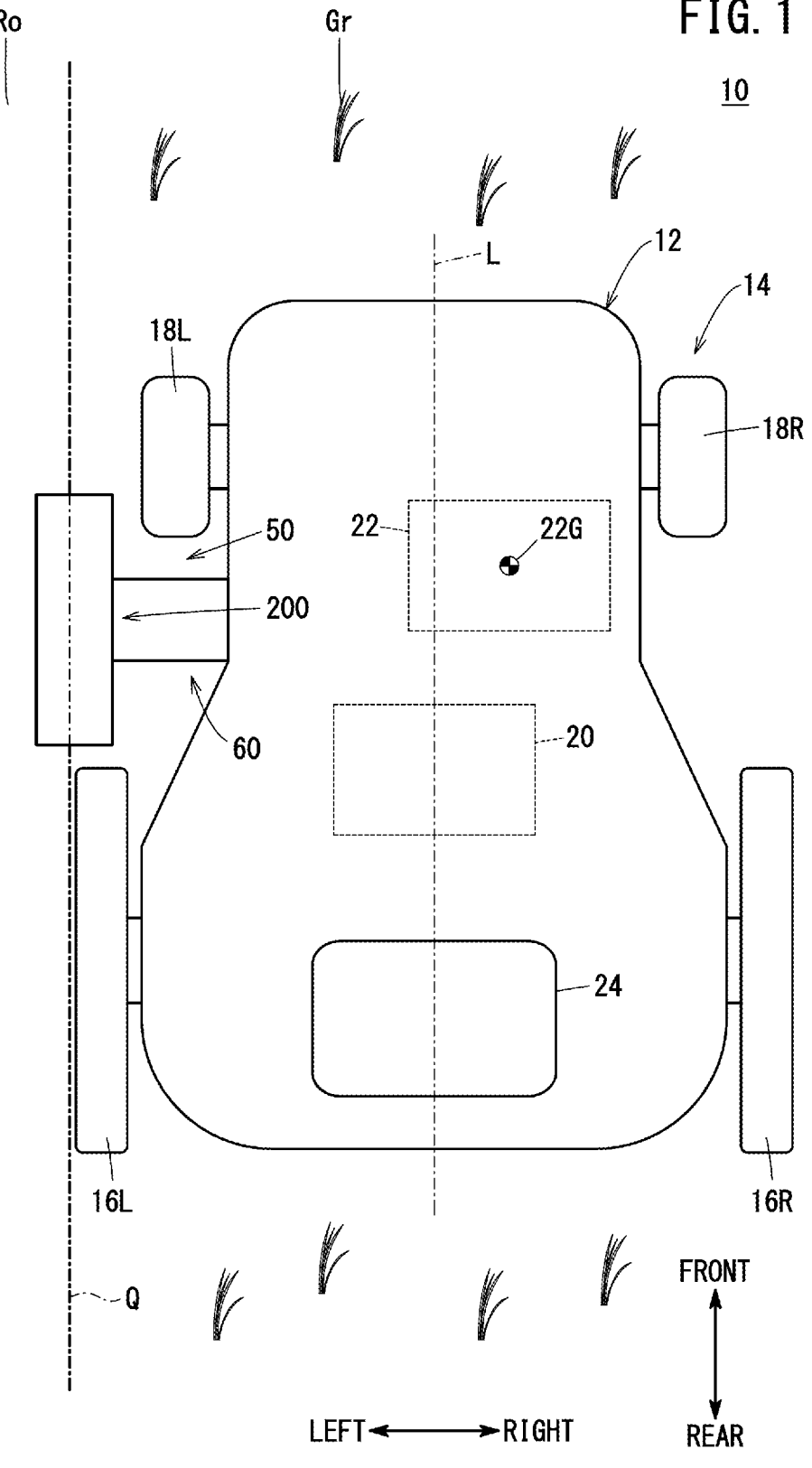
FIG. 1 is a schematic plan view of an autonomous traveling work apparatus according to an embodiment of the present invention.

In the following description, the term "front (forward)" represents a normal traveling direction of an autonomous traveling work apparatus 10 as shown in FIG. 1. The term "rear (rearward)" represents the direction opposite to the "front (forward)". The terms "left" and "right" represent the left and right sides, respectively, when a user of the autonomous traveling work apparatus 10 views the front from the rear of the autonomous traveling work apparatus 10. Therefore, the term "vehicle width direction" of a vehicle body 12 of the autonomous traveling work apparatus 10 is synonymous with the "left-right direction". Further, in the following description, lawn is exemplified as vegetation in order to simplify the description and facilitate understanding, but the vegetation is not limited to lawn. Examples of vegetation other than lawn include weeds.

FIG. 1 is a schematic plan view of the autonomous traveling work apparatus 10 according to the present embodiment. The autonomous traveling work apparatus 10 includes the vehicle body 12 and traveling wheels 14. The traveling wheels 14 include a left rear wheel 16L and a right rear wheel 16R, which are driving wheels, and a left front wheel 18L and a right front wheel 18R, which are driven wheels. The autonomous traveling work apparatus 10 further includes a control unit 20 that controls the traveling wheels 14, and a work unit 50 that mows lawn.

While specifying the position of the autonomous traveling work apparatus 10 based on a position signal from the GNSS satellite, the control unit 20 controls the left rear wheel 16L and the right rear wheel 16R, which are driving wheels, based on map data stored in the control unit, thereby moving the vehicle body 12 to an edge of the lawn. Since this control is a known technique described in JP 2021-153507 A, a detailed description thereof will be omitted. The edge of the lawn is a boundary Q between a lawn surface Gr and a portion Ro other than the lawn surface Gr. The portion Ro other than the lawn surface Gr is, for example, a sidewalk, a roadway, or the like.

A battery 22 is mounted on the vehicle body 12. The battery 22 supplies electric power to the traveling wheels 14 and the work unit 50. In the present embodiment, the work unit 50 is disposed on the left side of the vehicle body 12. The battery 22 is disposed close to the right side portion of the vehicle body 12. Therefore, a center of gravity 22G of the battery 22 is shifted toward the right side portion from a center line L in the vehicle width direction. As a result, the weight of the autonomous traveling work apparatus 10 can be balanced in the vehicle width direction.

Figure 2:
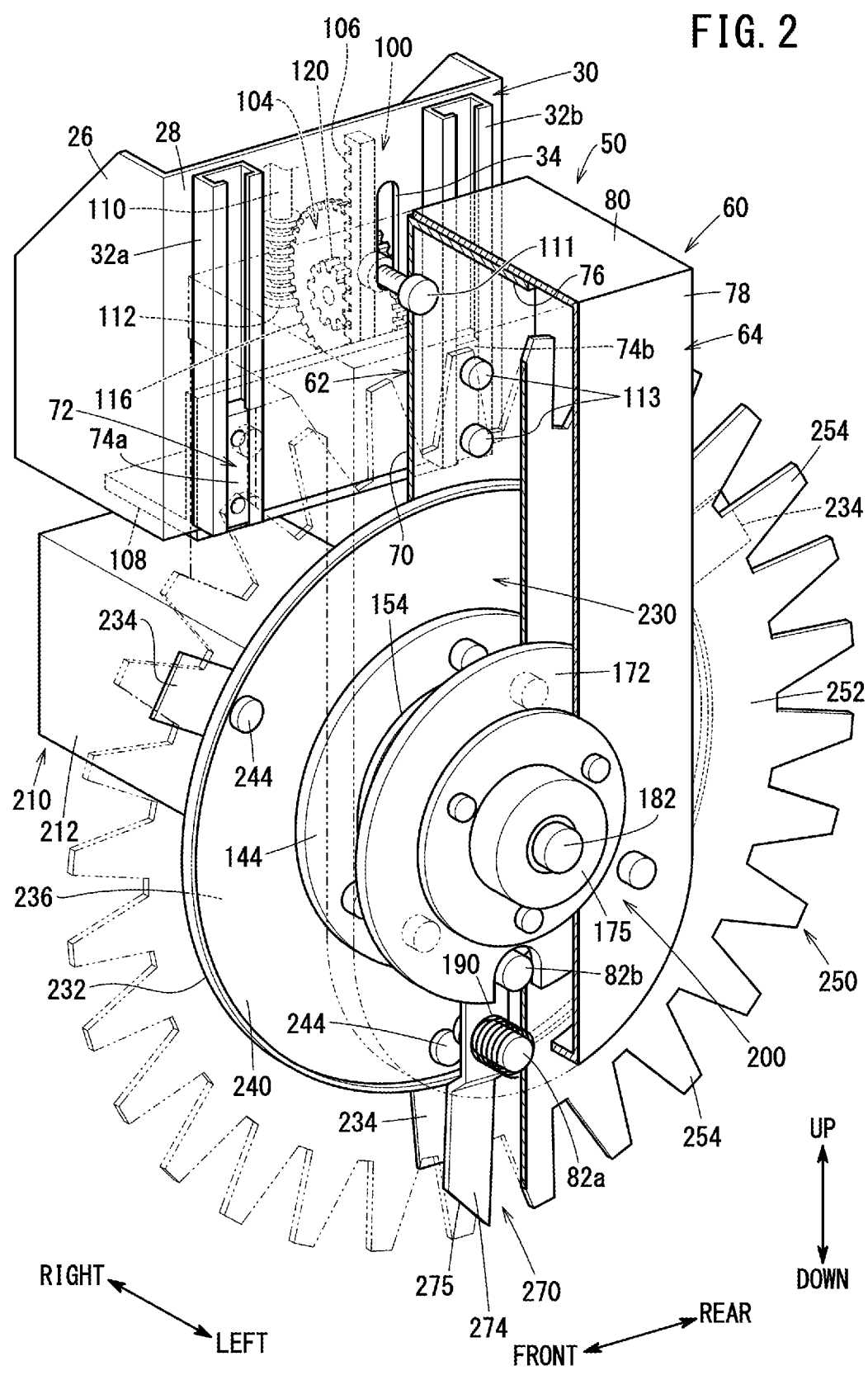
FIG. 2 is a schematic perspective view of a work unit constituting the autonomous traveling work apparatus.
Figure 3:
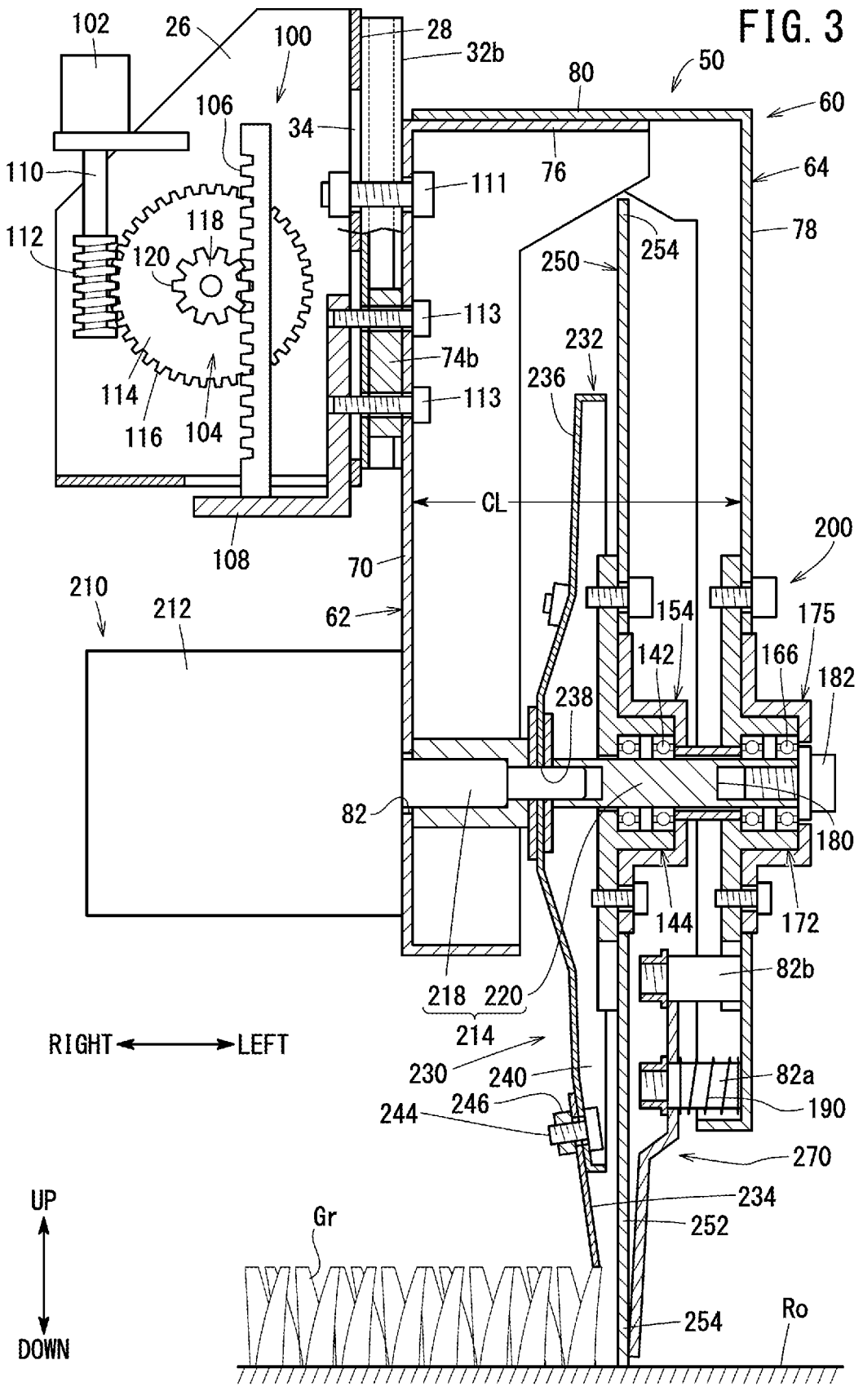
FIG. 3 is a vertical cross-sectional view of the work unit.

The work unit 50 has a function of mowing the edge of lawn. FIG. 2 is a schematic perspective view of the work unit 50, and FIG. 3 is a vertical cross-sectional view of the work unit 50 viewed along the vehicle width direction of the vehicle body 12. A bracket 26 is provided on the left side of the vehicle body 12. The work unit 50 is held by the vehicle body 12 via the bracket 26. The work unit 50 includes a support section 60 and a cutting section 200. The support section 60 includes a first holding member 62 and a second holding member 64. The cutting section 200 includes a drive device 210, a driving rotary cutter 230, a passive rotary cutter 250, and a fixed cutter 270.

As shown in FIG. 2, a first engaging portion 30 is provided on a side surface 28 of the bracket 26 that faces outward in the vehicle width direction. The first engaging portion 30 includes a first rail 32*a* and a second rail 32*b*. The first rail 32*a* and the second rail 32*b* extend in the up-down direction. An elongated hole 34 is formed in the side surface 28 of the bracket 26, between the first rail 32*a* and the second rail 32*b*. The elongated hole 34 is close to the second rail 32*b*.

As shown in FIG. 3, a moving device 100 is disposed in the vicinity of the bracket 26 in the vehicle body 12. The moving device 100 includes a movement motor 102, a two-stage gear 104, and a moving table 108 provided with a rack 106. Alternatively, the moving device 100 may be a cylinder or a coil spring.

An output shaft 110 of the movement motor 102 extends downward. A worm 112 is provided at a lower end of the output shaft 110. The two-stage gear 104 includes an input tooth portion 116 provided on a side wall of a large diameter portion 114, and a pinion 120 provided on a side wall of a small diameter portion 118. The worm 112 meshes with the input tooth portion 116. The pinion 120 meshes with the rack 106. The moving table 108 is connected to a first vertical wall portion 70 of the first holding member 62 constituting the support section 60, via a connecting bolt 111 passed through the elongated hole 34. When the movement motor 102 is driven and the output shaft 110 rotates, the pinion 120 follows the rotation and rotates. With this follow-up rotation, the moving table 108 provided with the rack 106 and the support section 60 connected to the moving table 108 move upward or downward.

A second engaging portion 72 is provided on a surface of the first vertical wall portion 70 that faces inward in the vehicle width direction and faces the bracket 26. The second engaging portion 72 includes a first guide plate 74*a* inserted into the first rail 32*a*, and a second guide plate 74*b* inserted into the second rail 32*b*. The first guide plate 74*a* and the second guide plate 74*b* are connected to the first holding member 62 via connecting bolts 113. The first guide plate 74*a* is slidable within the first rail 32*a*. Similarly, the second guide plate 74*b* is slidable within the second rail 32*b*. As can be understood from this, the second engaging portion 72 engages with the first engaging portion 30 so as to be movable in the up-down direction.

A first horizontal wall portion 76 that extends outward in the vehicle width direction is provided at an upper end of the first vertical wall portion 70. The first horizontal wall portion 76 is substantially orthogonal to the first vertical wall portion 70. Similarly, the second holding member 64 includes a second vertical wall portion 78 extending in the up-down direction, and a second horizontal wall portion 80 provided at an upper end of the second vertical wall portion

78. The second horizontal wall portion 80 extends inward in the vehicle width direction and is placed on the first horizontal wall portion 76. In this state, the first horizontal wall portion 76 and the second horizontal wall portion 80 are connected to each other. A predetermined clearance CL is formed between the first vertical wall portion 70 and the second vertical wall portion 78.

The drive device 210 is disposed inward of the first vertical wall portion 70 in the vehicle width direction. The drive device 210 is supported by the first vertical wall portion 70. In the present embodiment, the drive device 210 is a rotation motor 212. The rotation motor 212 includes a rotation shaft 214 extending in the horizontal direction. The rotation shaft 214 is inserted through a first shaft insertion hole 82 formed in the first vertical wall portion 70, and extends outward in the vehicle width direction. Here, the rotation shaft 214 includes a drive shaft 218 of the rotation motor 212, and an extension shaft 220 connected to a distal end of the drive shaft 218. As the drive shaft 218 rotates, the extension shaft 220 rotates integrally with the drive shaft 218.

Figure 4:
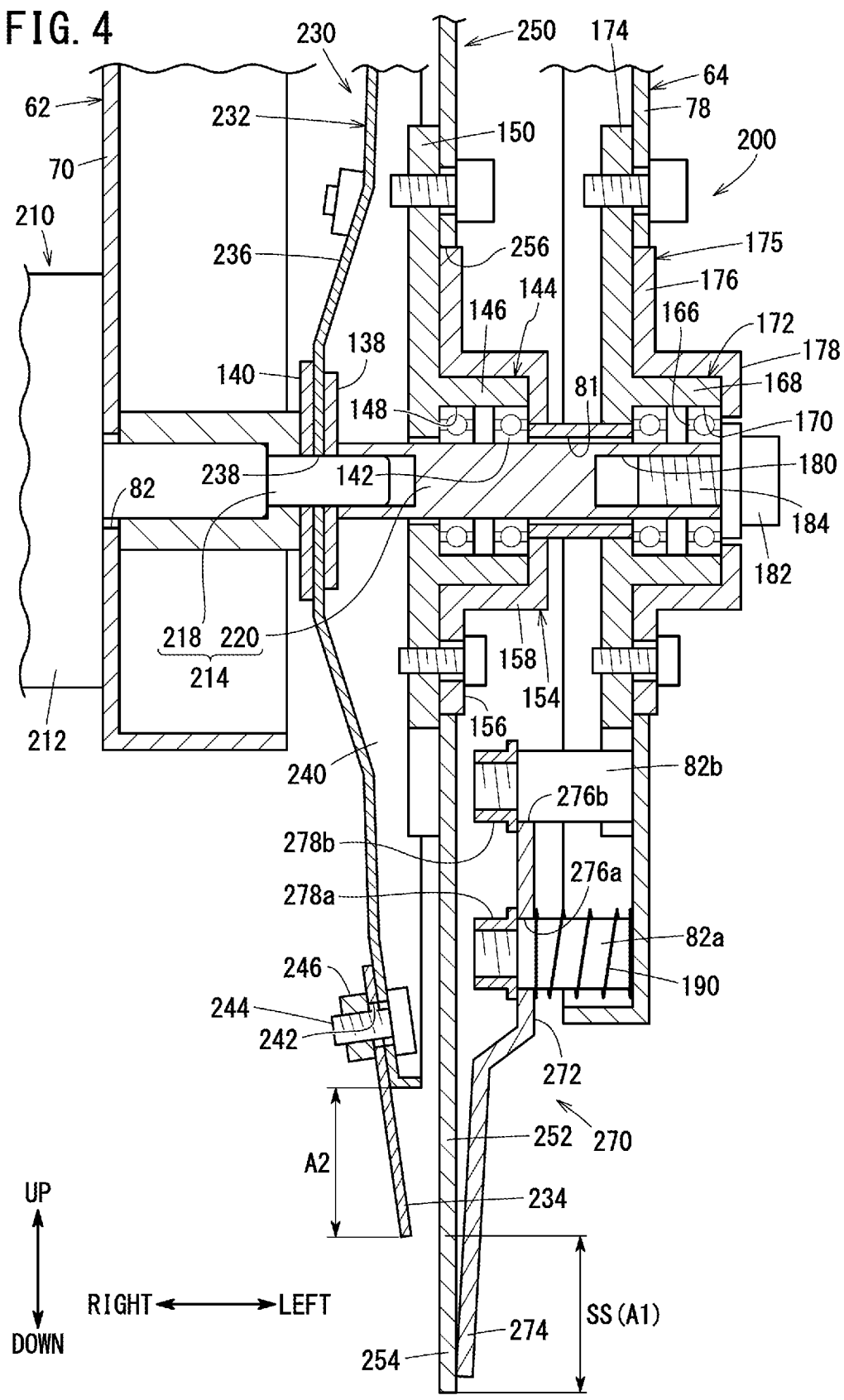
FIG. 4 is an enlarged view of a main part of FIG. 3.

The drive shaft 218 constituting the rotation shaft 214 supports the driving rotary cutter 230. The driving rotary cutter 230 includes a rotating body 232 and blades 234. As shown in FIGS. 3 and 4, the rotating body 232 has a hollow cup shape. The drive shaft 218 is inserted into a recess 240 of the rotating body 232 through a second shaft insertion hole 238 formed in a bottom portion 236 of the rotating body 232 that faces the rotation motor 212. A nut 138 is attached to the drive shaft 218 in the recess 240 of the rotating body 232. The bottom portion 236 of the rotating body 232 is sandwiched between the nut 138 and a stopper 140 that is attached to the drive shaft 218. As a result, the rotating body 232 is supported by the drive shaft 218.

In the present embodiment, the driving rotary cutter 230 includes three blades 234. A holding hole 242 is formed in one blade 234. A holding bolt 244 protruding from the recess 240 to the outside of an outer surface of the bottom portion 236 is passed through the holding hole 242. A holding nut 246 is screwed onto the holding bolt 244. As a result, the blades 234 are held by the rotating body 232. When a predetermined load or more is applied to each of the blades 234, the blade 234 can rotate relative to the rotating body 232 about the holding bolt 244.

Alternatively, the driving rotary cutter 230 may be configured by integrally providing the blades 234 on an outer peripheral portion of the rotating body 232. In this case, the blades 234 each extend outward in the radial direction of the rotating body 232 from the outer peripheral portion of the rotating body 232.

In the recess 240 of the rotating body 232, the extension shaft 220 is connected to the distal end of the drive shaft 218. The nut 138 is sandwiched between the bottom portion 236 of the rotating body 232 and an end surface of the extension shaft 220.

The extension shaft 220 supports the passive rotary cutter 250 via a first bearing 142 in a relatively rotatable manner. Therefore, the rotation axis passing through the rotation center of the driving rotary cutter 230 and the rotation center of the passive rotary cutter 250 is the axis of the rotation shaft 214. That is, the rotation center of the driving rotary cutter 230 and the rotation center of the passive rotary cutter 250 coincide with each other. Since the driving rotary cutter 230 and the passive rotary cutter 250 can be simultaneously supported by the rotation shaft 214, the configuration of the cutting section 200 is simplified.

In the present embodiment, the axis of the rotation shaft 214, which serves as the rotation center of the driving rotary cutter 230 and the rotation center of the passive rotary cutter 250, is oriented in the vehicle width direction, which is one of the horizontal directions. However, the axis of the rotation shaft 214 may be oriented in a direction intersecting the front-rear direction of the vehicle body 12. That is, the axis of the rotation shaft 214 may not be oriented in the horizontal direction. For example, the axis of the rotation shaft 214 may be inclined upward as the distance from the vehicle body 12 increases. Further, it is not essential that the rotation center of the driving rotary cutter 230 and the rotation center of the passive rotary cutter 250 coincide with each other. In other words, the rotation center of the driving rotary cutter 230 and the rotation center of the passive rotary cutter 250 may not coincide with each other.

The extension shaft 220 is passed through a first inner hole 148 formed in a first cylindrical portion 146 of a first bearing holder 144. The first bearing 142 is disposed in the first inner hole 148. A first circular plate portion 150 of the first bearing holder 144 has a surface facing outward in the vehicle width direction, and a second circular plate portion 156 of a first cover 154 is disposed on this surface. A second cylindrical portion 158 of the first cover 154 covers the first cylindrical portion 146.

The passive rotary cutter 250 includes a disk part 252, and a plurality of blade parts 254 provided on an outer peripheral portion of the disk part 252. A circular plate portion insertion hole 256 is formed in the disk part 252. The second circular plate portion 156 of the first cover 154 is inserted into the circular plate portion insertion hole 256. The diameter of the circular plate portion insertion hole 256 is substantially equal to the outer diameter of the second circular plate portion 156. In this state, the disk part 252 is connected to the first circular plate portion 150 of the first bearing holder 144.

The first bearing 142 is interposed between the extension shaft 220 (a part of the rotation shaft 214) and the passive rotary cutter 250. The first bearing 142 prevents the passive rotary cutter 250 from rotating in accordance with the rotation of the rotation shaft 214.

The distal end of the extension shaft 220 is supported by the second holding member 64 via a second bearing 166. Specifically, the extension shaft 220 is passed through a third shaft insertion hole 81 formed in the second holding member 64, and is further passed through a second inner hole 170 formed in a third cylindrical portion 168 of a second bearing holder 172. The second bearing 166 is disposed in the second inner hole 170. A third circular plate portion 174 of the second bearing holder 172 is connected to the second holding member 64. A fourth circular plate portion 176 of a second cover 175 is disposed on a surface of the third circular plate portion 174 that faces outward in the vehicle width direction. A fourth cylindrical portion 178 of the second cover 175 covers the third cylindrical portion 168. A threaded portion 184 of a plug bolt 182 is inserted into a connecting hole 180 formed at the distal end of the extension shaft 220.

The second holding member 64 includes two protrusions 82a and 82b. The two protrusions 82a and 82b extend inward in the vehicle width direction from a surface of the second holding member 64 that faces inward in the vehicle width direction. The two protrusions 82a and 82b are arranged side by side in the up-down direction. The fixed cutter 270 includes a body portion 272 and a blade body 274. In the body portion 272, two through holes 276a and 276b are formed side by side in the up-down direction. The two protrusions 82a and 82b are passed through the two through holes 276a and 276b, respectively. Further, cap nuts 278a and 278b are put on the two protrusions 82a and 82b, respectively. The cap nuts 278a and 278b serve to prevent the protrusions 82a and 82b from coming off the through holes 276a and 276b, respectively.

The lower protrusion 82a is passed through a coil spring 190, which is an elastic member. In other words, the lower protrusion 82a is surrounded by the coil spring 190. One end of the coil spring 190 is in contact with the surface of the second holding member 64 that faces inward in the vehicle width direction. The other end of the coil spring 190 passes through the through hole 276a and is wound around a side portion of the cap nut 278a. Therefore, the coil spring 190 elastically biases the body portion 272 of the fixed cutter 270 toward the disk part 252 of the passive rotary cutter 250.

The second bearing 166 is interposed between the extension shaft 220 (the rotation shaft 214) and the second holding member 64. The rotation shaft 214 is rotatably supported by the second holding member 64 via the second bearing 166.

The body portion 272 of the fixed cutter 270 is bent so as to approach the disk part 252 of the passive rotary cutter 250. As shown in FIG. 2, the blade body 274 of the fixed cutter 270 has an inclined portion 275 that is inclined downward from the front to the rear.

A shearing region SS is formed by the blade body 274 of the fixed cutter 270 and the blade part 254 of the passive rotary cutter 250. Therefore, the shearing region SS is provided below a shearing mechanism constituted by the fixed cutter 270 and the passive rotary cutter 250. As understood from FIGS. 3 and 4, the blade 234 constituting the driving rotary cutter 230 is located above the lower end of the passive rotary cutter 250 (the blade part 254 located at the lowermost position). Further, the blade 234 is located above the shearing region SS.

In the above-described configuration, the driving rotary cutter 230, the passive rotary cutter 250, and the fixed cutter 270 are disposed in the clearance CL formed between the first vertical wall portion 70 of the first holding member 62 and the second vertical wall portion 78 of the second holding member 64.

Next, an operation of the autonomous traveling work apparatus 10 will be described.

The user inputs a mowing height of the lawn to the control unit 20 via a command input unit 24 provided on the vehicle body 12. The control unit 20 moves the work unit 50 according to the mowing height that has been input. For example, when lowering the work unit 50, the control unit 20 drives the movement motor 102. As a result, the output shaft 110 and the worm 112 rotate integrally. Since the input tooth portion 116 of the two-stage gear 104 meshes with the worm 112, the input tooth portion 116 and the pinion 120 rotate. Since the rack 106 meshes with the pinion 120, the pinion 120 and the moving table 108 are lowered integrally.

As described above, the first holding member 62 constituting the support section 60 is connected to the moving table 108. Therefore, as the moving table 108 is lowered, the support section 60 and the cutting section 200 are lowered integrally. At this time, the first guide plate 74a and the second guide plate 74b forming the second engaging portion 72 are lowered while being guided by the first rail 32a and the second rail 32b forming the first engaging portion 30. When the blade 234 of the driving rotary cutter 230 reaches the height position corresponding to the mowing height, the control unit 20 stops the movement motor 102.

When raising the work unit 50, the control unit 20 sets the rotation direction of the output shaft 110 of the movement motor 102 to the direction opposite to the rotation direction when lowering the work unit 50.

The autonomous traveling work apparatus 10 travels based on the map data stored in advance in the control unit 20. That is, the control unit 20 performs control so that the vehicle body 12 moves to the boundary Q between the lawn surface Gr and the portion Ro other than the lawn surface Gr (the road or the like). The boundary Q is the edge of the lawn. The control unit 20 receives a position signal from the GNSS satellite and specifies the position of the autonomous traveling work apparatus 10. The inclined portion 275 of the fixed cutter 270 serves as a relief portion when the fixed cutter 270 comes into contact with a curb or the like.

When the autonomous traveling work apparatus 10 travels, the left rear wheel 16L and the right rear wheel 16R are driven to rotate, and the left front wheel 18L and the right front wheel 18R follow the rotation and rotate. When the blade part 254 constituting the passive rotary cutter 250 is in contact with the ground, the blade part 254 receives a ground reaction force. As the individual blade parts 254 sequentially receive the ground reaction force, the passive rotary cutter 250 rotates. As described above, the passive rotary cutter 250 is a shearing blade. In addition, the rotational speed of the passive rotary cutter 250 is a speed corresponding to the traveling speed of the autonomous traveling work apparatus 10 and is relatively low. For the above-described reason, the blade part 254 of the passive rotary cutter 250 is prevented from being worn in a short period of time due to contact of the blade part 254 with the ground.

When the vehicle body 12 reaches the edge of the lawn, the control unit 20 drives the rotation motor 212 which is the drive device 210. As a result, the rotation shaft 214 (the drive shaft 218 and the extension shaft 220) and the rotating body 232 supported by the rotation shaft 214 rotate. In accordance therewith, the blades 234 constituting the driving rotary cutter 230 rotate.

In the lawn, a portion near the ground is pinched and sheared between the blade part 254 of the passive rotary cutter 250 and the blade body 274 of the fixed cutter 270. In this way, edging for cutting the edge of the lawn is performed by the passive rotary cutter 250 and the fixed cutter 270. When a large amount of lawn grass is pinched between the blade part 254 and the blade body 274, the coil spring 190 contracts. When a small amount of lawn grass is pinched between the blade part 254 and the blade body 274, the coil spring 190 extends. In this manner, the distance between the blade part 254 and the blade body 274 is adjusted in accordance with the amount of lawn grass. Therefore, it is easy to shear the lawn in the shearing region SS.

The driving rotary cutter 230 cuts the lawn above the lower end of the passive rotary cutter 250. That is, as shown in FIG. 4, in the autonomous traveling work apparatus 10, a working region A1, which is the shearing region SS, and a working region A2 of the driving rotary cutter 230 are different from each other. Specifically, the working region A2 of the driving rotary cutter 230 is above the working region A1, which is the shearing region SS.

The autonomous traveling work apparatus 10 may include a rotary cutter (work unit) for mowing the lawn surface Gr. In this case, the rotary cutter (work unit) is provided, for example, at a lower portion of the vehicle body 12 constituting the autonomous traveling work apparatus 10.

The present embodiment exhibits the following effects.

The work unit 50 of the autonomous traveling work apparatus 10 includes the passive rotary cutter 250, the fixed cutter 270, and the driving rotary cutter 230. The passive rotary cutter 250 is rotatably supported on the side of the vehicle body 12, and has a plurality of blade parts 254 on the outer peripheral portion thereof. The rotation axis passing through the rotation center of the passive rotary cutter 250 is oriented in the vehicle width direction (one of the horizontal directions) intersecting (orthogonal to) the front-rear direction of the vehicle body 12. As the autonomous traveling work apparatus 10 travels, the passive rotary cutter 250 passively rotates in response to the passive rotary cutter 250 receiving the ground reaction force. The fixed cutter 270 is disposed on the side of the vehicle body 12, and faces the outer peripheral portion of the passive rotary cutter 250 (is adjacent to the passive rotary cutter 250 on the outer side in the vehicle width direction). The fixed cutter 270 does not rotate. The driving rotary cutter 230 is supported on the side of the vehicle body 12, has a rotation axis passing through a rotation center and oriented in the horizontal direction, and rotates by means of the rotation motor 212. In the above-described configuration, above the lower end of the passive rotary cutter 250, the driving rotary cutter 230 cuts the lawn located at the edge of the lawn surface Gr.

In this manner, when edging is performed by the autonomous traveling work apparatus 10, a portion of the lawn that is near the ground is cut by the fixed cutter 270 and the passive rotary cutter 250. The driving rotary cutter 230 cuts the other portion of the lawn, above the lower end of the passive rotary cutter 250. Therefore, the driving rotary cutter 230 is prevented from coming into contact with the ground. Thus, wear of the driving rotary cutter 230 is suppressed. As a result, the replacement frequency of the driving rotary cutter 230 is reduced, so that the running cost of the autonomous traveling work apparatus 10 can be reduced.

The blade body 274 of the fixed cutter 270 and the blade part 254 of the passive rotary cutter 250 form the shearing region SS therebetween. That is, a portion of the lawn that is near the ground is sheared in the shearing region SS. On the other hand, the driving rotary cutter 230 cuts the other portion of the lawn, above the shearing region SS. This further prevents the driving rotary cutter 230 from coming into contact with the ground. Therefore, wear of the driving rotary cutter 230 is further suppressed.

The work unit 50 includes the coil spring 190 that elastically biases the fixed cutter 270 toward the passive rotary cutter 250 or the shearing region SS. That is, the fixed cutter 270 is pressed toward the passive rotary cutter 250 by the coil spring 190. Therefore, the lawn can be reliably pinched between the blade body 274 of the fixed cutter 270 and the blade part 254 of the passive rotary cutter 250. As a result, edging (shearing) of the lawn by the fixed cutter 270 and the passive rotary cutter 250 is facilitated.

The driving rotary cutter 230 includes the rotating body 232 which rotates by means of the rotation motor 212, and the blade 234 which is supported on the outer peripheral portion of the rotating body 232 in a relatively rotatable manner with respect to the rotating body 232.

For example, the blade 234 may come into contact with a fence or the like. In this case, since a load acts on the blade 234, there is a concern that the blade 234 may be damaged. However, in the present embodiment, the blade 234 is supported on the rotating body 232 in a relatively rotatable manner. Therefore, when a predetermined load or more is applied to the blade 234, the blade 234 rotates relative to the rotating body 232. Since the load is absorbed by the relative rotation, breakage of the blade 234 due to the load is avoided.

The driving rotary cutter 230 is disposed inward of the passive rotary cutter 250 in the vehicle width direction.

According to this configuration, the driving rotary cutter 230 is protected by the passive rotary cutter 250. For example, foreign matter such as flying stones is unlikely to come into contact with the driving rotary cutter 230. Further, the driving rotary cutter 230 is further prevented from coming into contact with the ground. Therefore, breakage or wear of the driving rotary cutter 230 is further suppressed.

The autonomous traveling work apparatus 10 includes the moving device 100 that moves the work unit 50 in the up-down direction.

By moving the work unit 50 in the up-down direction with the moving device 100, the mowing height of the lawn can be adjusted.

The work unit 50 includes the support section 60 that supports the fixed cutter 270, the passive rotary cutter 250, the driving rotary cutter 230, and the drive device 210. The support section 60 can be moved in the up-down direction by the moving device 100. On the other hand, the vehicle body 12 includes the bracket 26. The second engaging portion 72 provided on the support section 60 engages with the first engaging portion 30 of the bracket 26 so as to be movable in the up-down direction.

When the support section 60 moves in the up-down direction, the second engaging portion 72 provided on the support section 60 is guided by the first engaging portion 30 of the bracket 26. Therefore, the support section 60 or the cutting section 200 (the work unit 50) is prevented from being displaced with respect to the vehicle body 12.

The rotation center of the driving rotary cutter 230 and the rotation center of the passive rotary cutter 250 are located on the same axis.

According to this configuration, the passive rotary cutter 250 and the driving rotary cutter 230 are aligned easily. In the above embodiment, the rotation axis passing through the rotation center of the driving rotary cutter 230 and the rotation center of the passive rotary cutter 250 is the axis of the rotation shaft 214.

The drive device 210 includes the rotation shaft 214 supporting the driving rotary cutter 230. The passive rotary cutter 250 is supported by the rotation shaft 214 via the first bearing 142.

Thus, when the rotation shaft 214 rotates and the driving rotary cutter 230 rotates, the first bearing 142 prevents the passive rotary cutter 250 from following the rotation and rotating. Therefore, it is possible to prevent the passive rotary cutter 250 from rotating following the rotation shaft 214 while aligning the driving rotary cutter 230 and the passive rotary cutter 250 with respect to the rotation shaft 214. As described above, the passive rotary cutter 250 rotates by receiving the ground reaction force when the autonomous traveling work apparatus 10 travels.

The work unit 50 includes the first holding member 62 holding the drive device 210, and the second holding member 64 holding the fixed cutter 270. The first holding member 62 and the second holding member 64 are connected to each other. In this configuration, the rotation shaft 214 is supported by the second holding member 64 via the second bearing 166.

Since the rotation shaft 214 is held by the second holding member 64, the passive rotary cutter 250 and the fixed cutter 270 are aligned easily. In addition, the second bearing 166 is interposed between the rotation shaft 214 and the second holding member 64. Therefore, when the rotation shaft 214 and the driving rotary cutter 230 rotate, the second holding member 64 and the fixed cutter 270 are prevented from following the rotation and rotating. In the above-described embodiment, the first holding member 62 and the second holding member 64 constitute the support section 60.

The driving rotary cutter 230, the passive rotary cutter 250, and the fixed cutter 270 are disposed between the first holding member 62 and the second holding member 64. Specifically, the driving rotary cutter 230, the passive rotary cutter 250, and the fixed cutter 270 are located in the clearance CL formed between the first vertical wall portion 70 of the first holding member 62 and the second vertical wall portion 78 of the second holding member 64.

As a result, the driving rotary cutter 230, the passive rotary cutter 250, and the fixed cutter 270 are protected by the first holding member 62 and the second holding member 64. For example, contact of foreign matter such as flying stones with the driving rotary cutter 230, the passive rotary cutter 250, or the fixed cutter 270 is avoided.

The center of gravity 22G of the battery 22 mounted on the vehicle body 12 is shifted from the center line L of the vehicle body 12 in the left-right direction (the vehicle-width direction) toward the right side portion of the vehicle body 12. The right side portion is a side portion located on the opposite side to the left side where the work unit 50 is provided.

According to this configuration, the weight of the vehicle body 12 can be balanced in the left-right direction by the work unit 50 and the battery 22. Therefore, the autonomous traveling work apparatus 10 is unlikely to fall down during autonomous traveling.

The following notes (appendices) are further disclosed in relation to the above-described embodiment.

Appendix 1

The autonomous traveling work apparatus (10) includes: the traveling wheel (14) provided on the vehicle body (12); the control unit (20) configured to control the traveling wheel; and the work unit (50) configured to mow vegetation. The work unit includes the passive rotary cutter (250) configured to passively rotate, the driving rotary cutter (230) configured to be driven to rotate, and the fixed cutter (270) configured not to rotate. The passive rotary cutter is rotatably supported on one of the left side or the right side of the vehicle body, has the rotation axis passing through the rotation center of the passive rotary cutter and oriented in the direction intersecting the front-rear direction of the vehicle body, and includes the plurality of blade parts (254) on the outer peripheral portion of the passive rotary cutter. The fixed cutter is disposed on the one of the left side or the right side of the vehicle body and is disposed adjacent to the passive rotary cutter. The driving rotary cutter is supported on the one of the left side or the right side portion of the vehicle body, has the rotation axis passing the rotation center of the driving rotary cutter and oriented in the direction intersecting the front-rear direction, and is configured to rotate by means of the drive device (210). In the above configuration, the driving rotary cutter cuts the vegetation above the lower end of the passive rotary cutter.

When edging of vegetation is performed by the autonomous traveling work apparatus, a portion of the vegetation that is near the ground is cut by the fixed cutter and the passive rotary cutter. The driving rotary cutter cuts the vegetation above the lower end of the passive rotary cutter. Therefore, the driving rotary cutter is prevented from coming into contact with the ground. Accordingly, wear of the driving rotary cutter is suppressed.

As a result, the replacement frequency of the driving rotary cutter is reduced, so that the running cost of the autonomous traveling work apparatus can be reduced.

Appendix 2

In the autonomous traveling work apparatus according to Appendix 1, the fixed cutter and each of the blade parts may form the shearing region (SS) in which the vegetation is pinched and sheared between the fixed cutter and the blade part, and the driving rotary cutter may cut the vegetation above the shearing region.

A portion of the vegetation that is near the ground is sheared in the shearing region. The vegetation can be easily mowed by the shearing action. The driving rotary cutter cuts the vegetation above the shearing region. This further prevents the driving rotary cutter from coming into contact with the ground.

Appendix 3

In the autonomous traveling work apparatus according to Appendix 1 or 2, the work unit may include the elastic member (190) configured to elastically bias the fixed cutter toward the passive rotary cutter.

The vegetation can be reliably pinched between the passive rotary cutter and the fixed cutter elastically biased toward the passive rotary cutter. Therefore, it becomes easy to mow the vegetation.

Appendix 4

In the autonomous traveling work apparatus according to any one of Appendices 1 to 3, the driving rotary cutter may include the rotating body (232) configured to rotate by means of the drive device, and the blade (234) that is supported on the outer peripheral portion of the rotating body in a relatively rotatable manner with respect to the rotating body.

When a predetermined load or more is applied to the blade, the blade rotates relative to the rotating body. Since the load is absorbed by this rotation, breakage of the blade due to the load is avoided.

Appendix 5

In the autonomous traveling work apparatus according to any one of Appendices 1 to 4, the driving rotary cutter may be disposed inward of the passive rotary cutter in the width direction of the vehicle body.

According to this configuration, the driving rotary cutter is protected by the passive rotary cutter. Therefore, breakage or wear of the driving rotary cutter is further suppressed.

Appendix 6

The autonomous traveling work apparatus according to any one of Appendices 1 to 5 may include the moving device (100) configured to move the work unit in the up-down direction.

By moving the work unit in the up-down direction, the mowing height of the vegetation can be adjusted.

Appendix 7

In the autonomous traveling work apparatus according to Appendix 6, the work unit may include the support section

(60) that is configured to support the fixed cutter, the passive rotary cutter, the driving rotary cutter, and the drive device, and is configured to be moved in the up-down direction by the moving device, and the vehicle body may include the bracket (26). The bracket may be provided with the first engaging portion (30), the support section may be provided with the second engaging portion (72), and the second engaging portion may engage with the first engaging portion movably in the up-down direction.

When the support section moves in the up-down direction, the second engaging portion provided on the support section is guided by the first engaging portion of the bracket. Therefore, the work unit is prevented from being displaced with respect to the vehicle body.

Appendix 8

In the autonomous traveling work apparatus according to any one of Appendices 1 to 7, the rotation center of the driving rotary cutter and the rotation center of the passive rotary cutter may be located on the same axis.

In this case, the passive rotary cutter and the driving rotary cutter are aligned easily.

Appendix 9

In the autonomous traveling work apparatus according to Appendix 8, the drive device may include the rotation shaft (214) configured to support the driving rotary cutter, and the passive rotary cutter may be supported by the rotation shaft via the first bearing (142).

In this configuration, the rotation shaft can serve as the rotation center of the driving rotary cutter and the rotation center of the passive rotary cutter. Thus, when the rotation shaft rotates and the driving rotary cutter rotates, the first bearing prevents the passive rotary cutter from following the rotation and rotating.

Appendix 10

In the autonomous traveling work apparatus according to Appendix 9, the work unit may include the first holding member (62) holding the drive device, and the second holding member (64) holding the fixed cutter, the first holding member and the second holding member may be connected to each other, and the rotation shaft may be supported by the second holding member via the second bearing (166).

Since the rotation shaft is supported by the second holding member holding the fixed cutter, the passive rotary cutter and the fixed cutter are aligned easily. When the rotation shaft rotates and the driving rotary cutter rotates, the second bearing prevents the second holding member and the fixed cutter from following the rotation and rotating.

Appendix 11

In the autonomous traveling work apparatus according to Appendix 10, the driving rotary cutter, the passive rotary cutter, and the fixed cutter may be disposed between the first holding member and the second holding member.

The driving rotary cutter, the passive rotary cutter, and the fixed cutter can be protected by the first holding member and the second holding member.

Appendix 12

The autonomous traveling work apparatus according to any one of Appendices 1 to 11 may include the battery (22)

mounted on the vehicle body. In this case, the center of gravity (22G) of the battery may be shifted from the center (L) of the vehicle body in the left-right direction toward the side portion of the vehicle body that is located on the opposite side to the one of the left side or the right side where the work unit is provided.

According to this configuration, the weight of the vehicle body can be balanced in the left-right direction by the work unit and the battery. Therefore, the autonomous traveling work apparatus is unlikely to fall down.

The present invention is not limited to the above disclosure, and various modifications are possible without departing from the essence and gist of the present invention.

The invention claimed is:

1. An autonomous traveling work apparatus comprising:
a traveling wheel provided on a vehicle body;
a control unit configured to control the traveling wheel; and
a work unit configured to recognize a boundary between vegetation to be mown and a portion other than the vegetation to be mown and to mow an edge of vegetation along the boundary, wherein
the work unit includes a support section and a cutting section,
the cutting section includes:
a passive rotary cutter that is rotatably supported on one of a left side or a right side of the vehicle body, has a rotation axis passing through a rotation center of the passive rotary cutter and oriented in a direction intersecting a front-rear direction of the vehicle body, and includes a plurality of blade parts on an outer peripheral portion of the passive rotary cutter;
a fixed cutter that is disposed on the one of the left side or the right side of the vehicle body, is supported by the support section, is disposed outwardly adjacent to the passive rotary cutter in a vehicle width direction, and is configured not to rotate; and
a driving rotary cutter that is supported on the one of the left side or the right side of the vehicle body, has a rotation axis passing through a rotation center of the driving rotary cutter and oriented in the direction intersecting the front-rear direction, is configured to rotate via a drive device, and is disposed inwardly adjacent to the passive rotary cutter in the vehicle width direction, and
wherein the passive rotary cutter passively rotates in response to the passive rotary cutter receiving a ground reaction force as the autonomous traveling work apparatus travels,
the fixed cutter and each of the blade parts form a shearing region above a ground, and the vegetation is pinched and sheared between the fixed cutter and the blade part in the shearing region, and
the driving rotary cutter cuts the vegetation above the shearing region.

2. The autonomous traveling work apparatus according to claim 1, wherein
the work unit includes an elastic member configured to elastically bias the fixed cutter toward the passive rotary cutter.

3. The autonomous traveling work apparatus according to claim 1, wherein
the driving rotary cutter includes a rotating body configured to rotate via the drive device, and a blade that is supported on an outer peripheral portion of the rotating body in a relatively rotatable manner with respect to the rotating body.

4. The autonomous traveling work apparatus according to claim 1, further comprising a moving device configured to move the work unit in an up-down direction.

5. The autonomous traveling work apparatus according to claim 4, wherein
the work unit includes the support section that is configured to support the fixed cutter, the passive rotary cutter, the driving rotary cutter, and the drive device, and is configured to be moved in the up-down direction by the moving device,
the vehicle body includes a bracket,
the bracket is provided with a first engaging portion, and the support section is provided with a second engaging portion, and
the second engaging portion engages with the first engaging portion movably in the up-down direction.

6. The autonomous traveling work apparatus according to claim 1, wherein
the rotation center of the driving rotary cutter and the rotation center of the passive rotary cutter are located on a same axis.

7. The autonomous traveling work apparatus according to claim 6, wherein
the drive device includes a rotation shaft configured to support the driving rotary cutter, and the passive rotary cutter is supported by the rotation shaft via a first bearing.

8. The autonomous traveling work apparatus according to claim 7, wherein
the work unit includes a first holding member holding the drive device, and a second holding member holding the fixed cutter,
the first holding member and the second holding member are connected to each other, and
the rotation shaft is supported by the second holding member via a second bearing.

9. The autonomous traveling work apparatus according to claim 8, wherein
the driving rotary cutter, the passive rotary cutter, and the fixed cutter are disposed between the first holding member and the second holding member.

10. The autonomous traveling work apparatus according to claim 1, further comprising a battery mounted on the vehicle body, wherein
a center of gravity of the battery is shifted from a center of the vehicle body in a left-right direction toward a side portion of the vehicle body that is located on an opposite side to the one of the left side or the right side where the work unit is provided.

* * * * *